United States Patent
Ishihara

(10) Patent No.: US 11,715,013 B2
(45) Date of Patent: Aug. 1, 2023

(54) MACHINE LEARNING DEVICE, INFORMATION PROCESSING DEVICE AND OUTPUT DEVICE

(71) Applicant: Yamaha Corporation, Hamamatsu (JP)

(72) Inventor: Kenji Ishihara, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 258 days.

(21) Appl. No.: 16/656,687

(22) Filed: Oct. 18, 2019

(65) Prior Publication Data

US 2020/0050944 A1 Feb. 13, 2020

Related U.S. Application Data

(63) Continuation of application No. PCT/JP2017/015924, filed on Apr. 20, 2017.

(51) Int. Cl.
*G06N 3/084* (2023.01)
*G06N 3/04* (2023.01)
*H04L 41/0631* (2022.01)
*H04L 41/16* (2022.01)

(52) U.S. Cl.
CPC .............. *G06N 3/084* (2013.01); *G06N 3/04* (2013.01); *H04L 41/065* (2013.01); *H04L 41/16* (2013.01)

(58) Field of Classification Search
CPC ........ G06N 3/084; G06N 3/04; H04L 41/065; H04L 41/16
See application file for complete search history.

(56) References Cited

U.S. PATENT DOCUMENTS

| 5,315,704 A | 5/1994 | Shinta |
| 5,717,155 A | 2/1998 | Szalay |
| 10,079,885 B1* | 9/2018 | Chaboud ............. H04L 67/1097 |
| 10,824,145 B1* | 11/2020 | Konrardy ........... G01C 21/3469 |
| 2002/0123863 A1 | 9/2002 | Sato |
| 2003/0220740 A1* | 11/2003 | Intriligator .............. G01W 1/10 702/3 |
| 2012/0036037 A1 | 2/2012 | Xiao et al. |

(Continued)

FOREIGN PATENT DOCUMENTS

| JP | 3-273722 A | 12/1991 |
| JP | 7-30540 A | 1/1995 |

(Continued)

OTHER PUBLICATIONS

Partial English translation of Japanese-language Office Action issued in Japanese Application No. 2019-513170 dated Dec. 8, 2020 (3 pages).

(Continued)

*Primary Examiner* — Patrice L Winder
*Assistant Examiner* — Angela M Widhalm de Rodriguez
(74) *Attorney, Agent, or Firm* — Crowell & Moring LLP

(57) ABSTRACT

A machine learning device includes at least one processor; and at least one memory device configured to store a program, the program executed by the at least one processor to cause the at least one processor to obtain at least one first information from a communication relay device, the first information changing due to communication of the communication relay device; and to correlate the obtained at least one first information with at least one characteristic of a replaceable candidate device to perform machine learning.

14 Claims, 6 Drawing Sheets

(56) References Cited

U.S. PATENT DOCUMENTS

| | | | | |
|---|---|---|---|---|
| 2012/0287937 | A1* | 11/2012 | Kaya | H04L 45/28 370/401 |
| 2013/0083722 | A1* | 4/2013 | Bhargava | H04W 72/085 370/315 |
| 2013/0312051 | A1* | 11/2013 | Srebranig | H04H 20/12 725/131 |
| 2015/0078166 | A1 | 3/2015 | Iwata | |
| 2015/0119082 | A1* | 4/2015 | Raman | H04W 4/029 455/456.3 |
| 2016/0162783 | A1* | 6/2016 | Tan | H04W 24/02 706/13 |
| 2018/0213037 | A1* | 7/2018 | Roman | H04L 67/34 |
| 2018/0254959 | A1* | 9/2018 | Mantyjarvi | H04L 41/22 |

FOREIGN PATENT DOCUMENTS

| | | |
|---|---|---|
| JP | 9-6339 A | 1/1997 |
| JP | 9-325769 A | 12/1997 |
| JP | 2002-261871 A | 9/2002 |
| JP | 2003-58350 A | 2/2003 |
| JP | 2013-534340 A | 9/2013 |
| WO | WO 2013/133303 A1 | 9/2013 |

OTHER PUBLICATIONS

International Search Report (PCT/ISA/210) issued in PCT Application No. PCT/JP2017/015924 dated Jul. 11, 2017 with English translation (two (2) pages).
Japanese-language Written Opinion (PCT/ISA/237) issued in PCT Application No. PCT/JP2017/015924 dated Jul. 11, 2017 (four (4) pages).
Partial English translation of Japanese Office Action issued in Japanese Application No. 2019-513170 dated Jul. 7, 2020 (four pages).
English translation of document C2 (Japanese-language Written Opinion (PCT/ISA/237) previously filed on Oct. 18, 2019) issued in PCT Application No. PCT/JP2017/015924 dated Jul. 11, 2017 (five pages).

* cited by examiner

FIG. 5

```
         203a            209a      207
          |               |         |
    ┌─────┴──────────────┬─┴────────┴──────┐
    │ • Number of ports  many │ Y-1  70,000 yen │
    │ • Speed            fast │ Y-2  65,000 yen │
    │ • VLAN          present │ Y-3  48,000 yen │
    │                         │  ...            │
    └─────────────────────────┴─────────────────┘ — 201a 203b            205
          |               |
    ┌─────┴──────────────┬─┴───────────────┐
    │ • Number of ports  many │ Z-1  50,000 yen │
    │ • Speed           usual │ Z-2  45,000 yen │
    │ • VLAN          present │ Y-4  39,000 yen │
    │                         │  ...            │
    └─────────────────────────┴─────────────────┘ — 201b

⋮

┌─────────────────────────┬─────────────────┐
    │ • Number of ports  usual │ A-1  18,000 yen │
    │ • Speed             slow │                 │
    │ • VLAN            absent │                 │
    └─────────────────────────┴─────────────────┘ — 201q
```

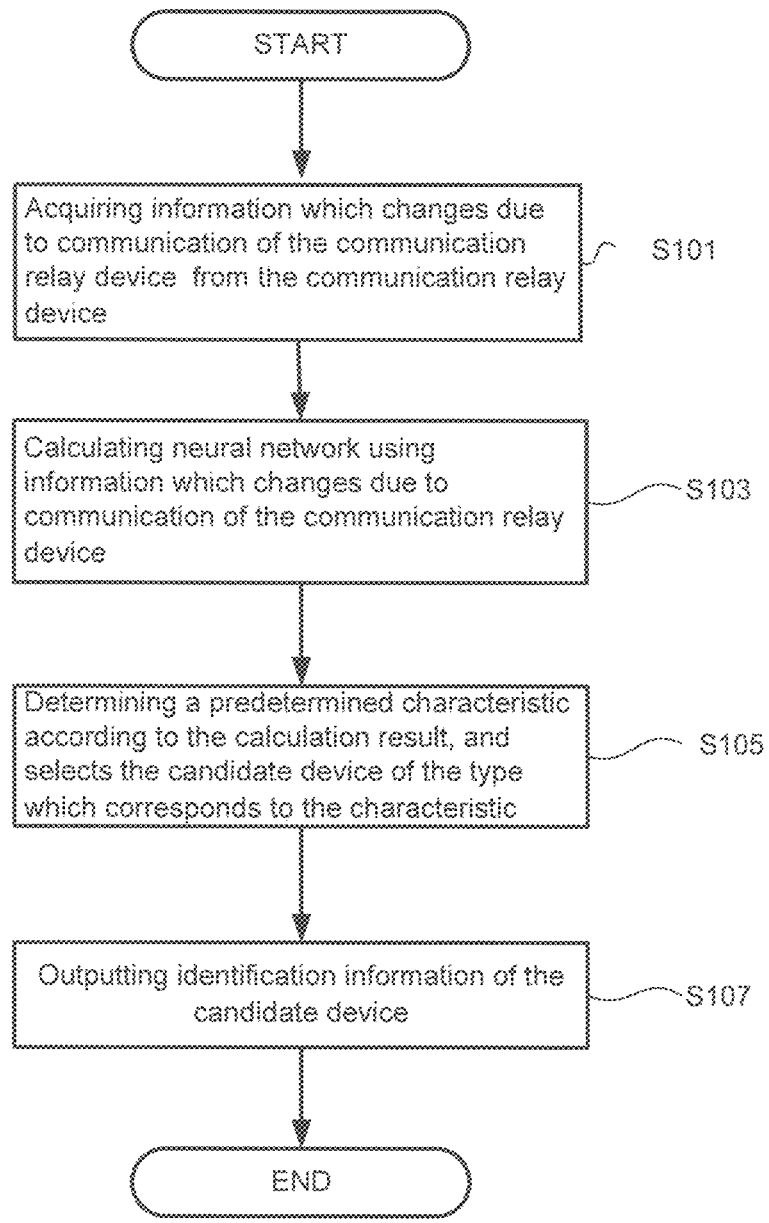

MACHINE LEARNING DEVICE, INFORMATION PROCESSING DEVICE AND OUTPUT DEVICE

CROSS REFERENCE TO RELATED APPLICATIONS

This application is a U.S continuation application filed under 35 U.S.C. § 111(a), of International Application No. PCT/JP2017/015924 filed on Apr. 20, 2017, the disclosures of which are incorporated by reference.

FIELD

The present invention is related to a machine learning device, an information processing device and an output device.

BACKGROUND

Network failures sometimes occur due to limitations in performance or a lack of specifications of network devices (communication relay devices) such as routers, switches and wireless LAN (Local Area Network) access points. In order to deal with such network failures, it is necessary to understand the product lineup of network devices which are updated daily and select an appropriate product.

On the other hand, there is a device which acquires information (for example, traffic) which shows a communication state between a network device and a terminal such as a PC from the network device and displays the information (for example, Japanese Laid Open Patent Publication No. 2002-261871). A network administrator can understand the communication state between the network device and a PC by confirming this displayed content. In this way, it is possible for the network administrator to access information which forms the basis for determining whether a failure has occurred in a network.

SUMMARY

One embodiment of the present invention provides a machine learning device including at least one processor; and at least one memory device configured to store a program, the program executed by the at least one processor to cause the at least one processor to: obtain at least one first information from a communication relay device, the first information changing due to communication of the communication relay device, and correlate the obtained at least first information with at least one characteristic of a replaceable candidate device.

Furthermore, one embodiment of the present invention provides an information processing device including at least one processor; and at least one memory device configured to store a program, the program executed by the at least one processor to cause the at least one processor to: obtain at least one first information from a communication relay device, the first information changing due to communication of the communication relay device; perform a certain calculation using the first information; and select at least one candidate device from a plurality of types of candidate devices registered as being replaceable devices from the communication relay device based on the result of the calculation.

Furthermore, one embodiment of the present invention provides an output device including: at least one processor; and at least one memory device configured to store a program, the program executed by the at least one processor to cause the at least one processor to: obtain at least one first information from a communication relay device, the first information changing due to communication of the communication relay device, and obtain a learning result performed by machine learning based on at least one characteristic of a replaceable candidate device; and output information related to at least one characteristic of the replaceable candidate device with respect to at least one first information based on the learning result, the first information changing due to communication of the communication relay device.

BRIEF DESCRIPTION OF DRAWINGS

FIG. 5 is a diagram for explaining the relationship between certain characteristics of an information processing device and a candidate device related to one embodiment of the present invention;

FIG. 6 is a diagram showing an operation flow of an information processing device related to one embodiment of the present invention.

DESCRIPTION OF EMBODIMENTS

Figure 1:
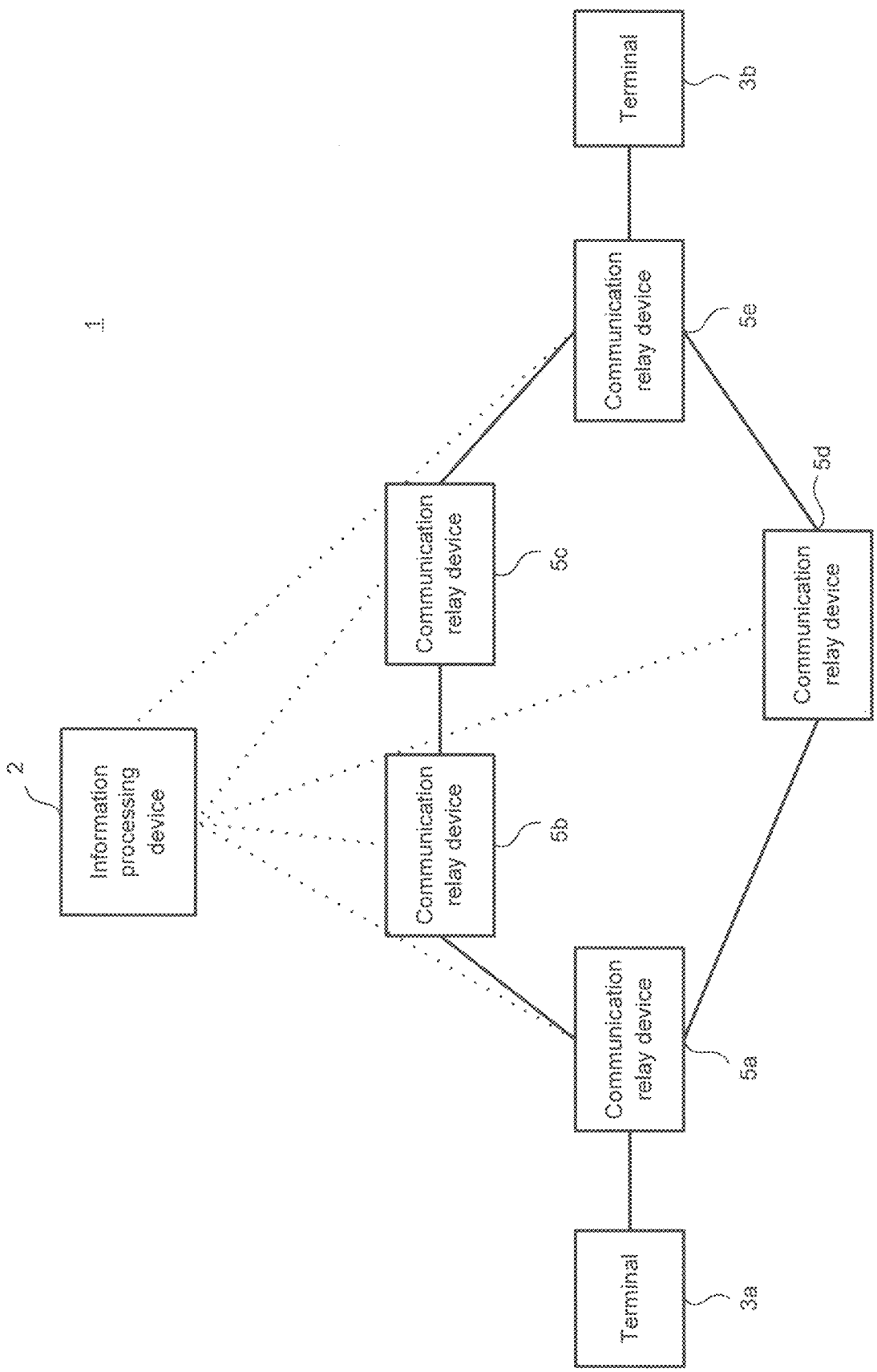
FIG. 1 is a block diagram showing a structure of a communication system related to one embodiment of the present invention.

One embodiment of the present invention is explained in detail below while referring to the drawings. The embodiments shown below are merely an example of an embodiment of the present invention, and the present invention should not to be interpreted as being limited to these embodiments. Furthermore, in the drawings which are referenced in the present embodiment, the same or similar reference symbols (symbols where only characters such as "a" and "b" are attached after a numeral) are provided to the same parts or parts having similar functions and a repeated explanation may be omitted.

Even if it is possible to understand the communication state such as traffic between a network device and a terminal such as a PC, since this information is specialized information, general users who do not have specialized knowledge may not understand which product to select in order to deal with a network failure due to performance limitations of a network device or lack of specifications.

The present invention aims to solve the problems associated with the prior described above, and the aim of the present invention is to provide information so that even a general user with no specialized knowledge can understand which product to select.

First Embodiment

[Structure of Communication System]

FIG. 1 is a block diagram showing a structure of a communication system related to one embodiment of the present invention. The communication system 1 is arranged with an information processing device 2, a terminal 3a, a terminal 3b (referred to below as "terminal 3" when no particular distinction is required), and communication relay devices 5a to 5e (referred to below as "communication relay device 5" when no particular distinction is required). Each of these structural elements is connected via a network such as the Internet.

The terminal 3 is a device which can communicate such as a smartphone or a personal computer for example. A plurality of communication relay devices 5 are present between the terminal 3a and the terminal 3b. For example, the communication relay device 5 is a router, a L2 switch, a L3 switch, an application switch, a wireless LAN access point or UTM (Unified Threat Management) or the like. As is described herein, the information processing device 2 acquires information which changes due to communication of the communication relay device from the communication relay device 5. However, the information which is acquired by the information processing device 2 is not limited to this and information related to the communication relay device 5 (for example, information for identifying the communication relay device 5) may also be acquired.

[Structure of Information Processing Device]

Figure 2:
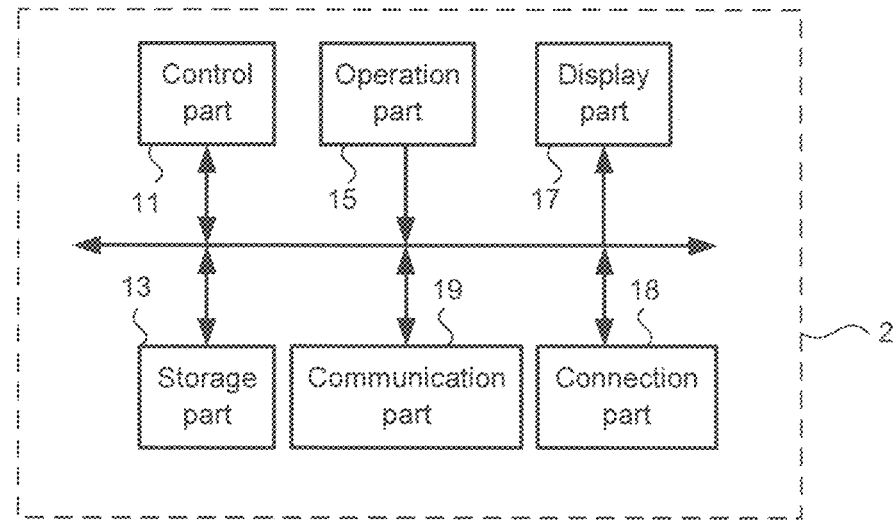
FIG. 2 is a block diagram showing a structure of an information processing device related to one embodiment of the present invention.

Next, the information processing device 2 is explained using FIG. 2. FIG. 2 is a block diagram showing a structure of an information processing device related to one embodiment of the present invention. The information processing device 2 is arranged with a control part 11, a storage part 13, an operation part 15, a display part 17, a connection part 18 and a communication part 19. Each of these structural components is connected via a bus.

The control part 11 includes a calculation processing circuit such as a CPU. The control part 11 executes a program which is stored in the storage part 13 by a CPU (computer) to realize a function for performing an output process described herein. A part or all of the structure for realizing this function is not limited to the case where it is realized by software by executing a program. A part or all of the structure for realizing this function may also be realized by hardware.

The storage part 13 is a storage device such as a non-volatile memory or a hard disk. The storage part 13 includes a storage area for storing application programs for realizing various functions such as the program described above. It is sufficient that the program be executable by a computer, and may be provided in a state in which it is stored in a non-transitory computer-readable recording medium such as a magnetic recording medium, an optical recording medium, a magneto-optical recording medium or a semiconductor memory. In this case, the information processing device 2 may also be arranged with a device which reads the recording medium. In addition, the program may be downloaded via a network.

The operation part 15 is a device such as an operation button, a keyboard or a mouse. The operation part 15 outputs a signal which corresponds to an operation input by a user to the control part 11. The display part 17 is a display device such as a liquid crystal display or an organic EL display. The display part 17 displays a screen based on control by the control part 11. Furthermore, the operation part 15 and the display part 17 may integrally form a touch panel. The communication part 18 communicates with an external device which is connected to a network based on the control of the control part 11. In this way, the communication part 18 transmits and receives information with external devices.

The connection part 19 is an interface for transmitting and receiving information by connecting to an external device. The connection between the connection part 19 and an external device may be a wired connection. Alternatively, the connection between the connection part 19 and an external device may be a wireless connection. In the case when the connection part 19 is connected to an external device by a wire, the connection part 19 is a connector which is connected to a cable or the like. In the case when the connection part 19 is wirelessly connected to an external device, the connection part 19 is a communication module which can communicate using, for example, a wireless LAN or Bluetooth (registered trademark) or the like. The above is an explanation of the hardware structure of the information processing device 2.

[Software Structure of Information Processing Device]

Figure 3:
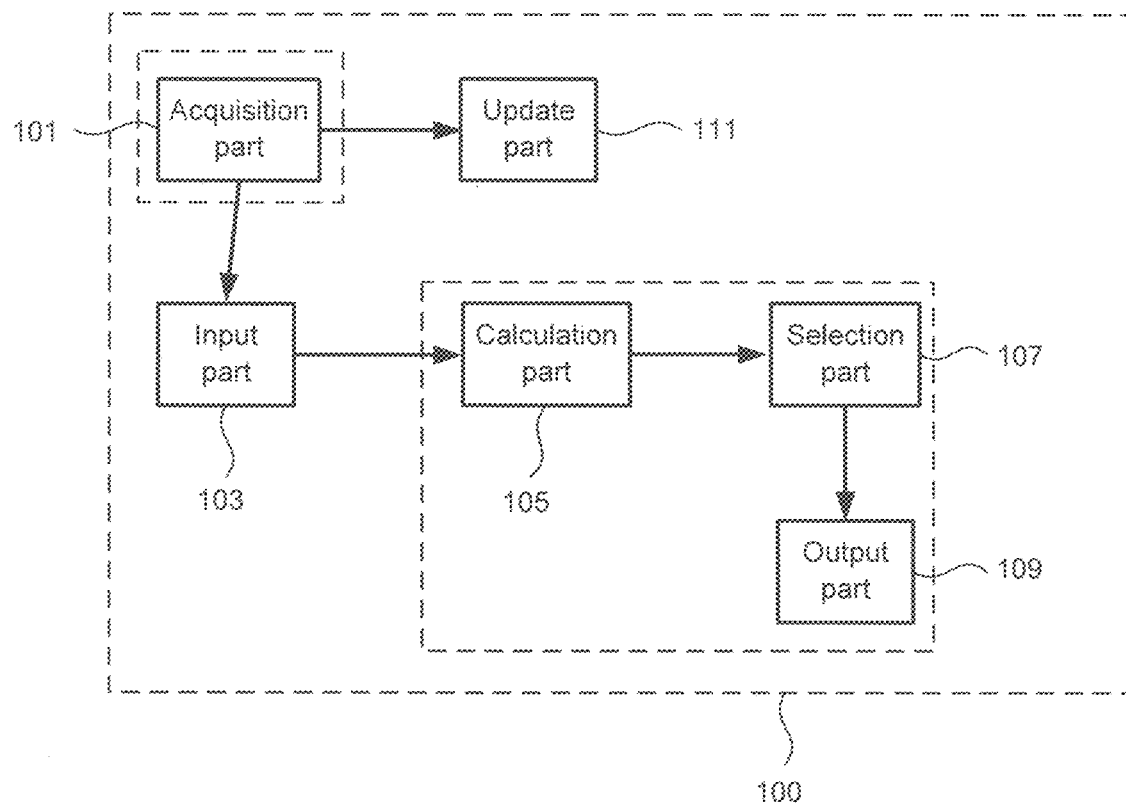
FIG. 3 is a block diagram showing a functional structure realized by a control part of an information processing system related to one embodiment of the present invention.

Next, the software structure of the information processing device 2 is explained using FIG. 3. FIG. 3 is a block diagram showing a functional structure which is realized by the control part of the information processing device related to one embodiment of the present invention. Here, a structure which is realized as a function (output function 100) for performing an output process by executing the program described above by the control part 11 is explained. The output function 100 includes an acquisition part 101, an input part 103, a calculation part 105, a selection part 107, an output part 109 and an update part 111.

The acquisition part 101 acquires information which changes due to communication of the communication relay device 5 from the communication relay device 5. Here, the information which changes due to the communication of the communication relay device 5 includes at least one of information showing the communication status of the communication relay device 5 and information related to internal resources of the communication relay device 5. Information which shows the communication status of the communication relay device 5 is information such as, for example, network traffic, wireless LAN channel usage rate, CRC (Cyclic Redundancy Check) error rate, presence or absence of radio wave interference, or the generation of a LAN port link down or loop and the like. On the other hand, information which is related to the internal resources of the communication relay device 5 is information such as a CPU usage rate, memory usage rate or the presence or absence of a buffer overflow inside the communication relay device 5. Here, information such as a link down of the LAN port or the generation of a loop is stored in a storage device of the communication relay device 5 as a log of the communication relay device 5. On the other hand, information such as network traffic, wireless LAN channel usage rate, CRC error rate, presence or absence of radio wave interference, CPU usage rate, memory usage rate or presence or absence of a buffer overflow in the communication relay device 5 is basically a current value (real-time data). This current value is an instant value at a specific time point of each information. However, this information is not limited to a current value, and may be an average value of values in a certain period. Furthermore, even if the information which is related to the internal resources of the communication relay device 5 is information such as the CPU usage rate, the memory usage rate or the presence or absence of a buffer overflow inside the communication relay device 5, it is possible to store this information in the storage device as a log. In this case, information such as the CPU usage rate, the memory usage rate and the presence or absence of a buffer overflow in the communication relay device 5 does not have to be a current value.

Figure 4:
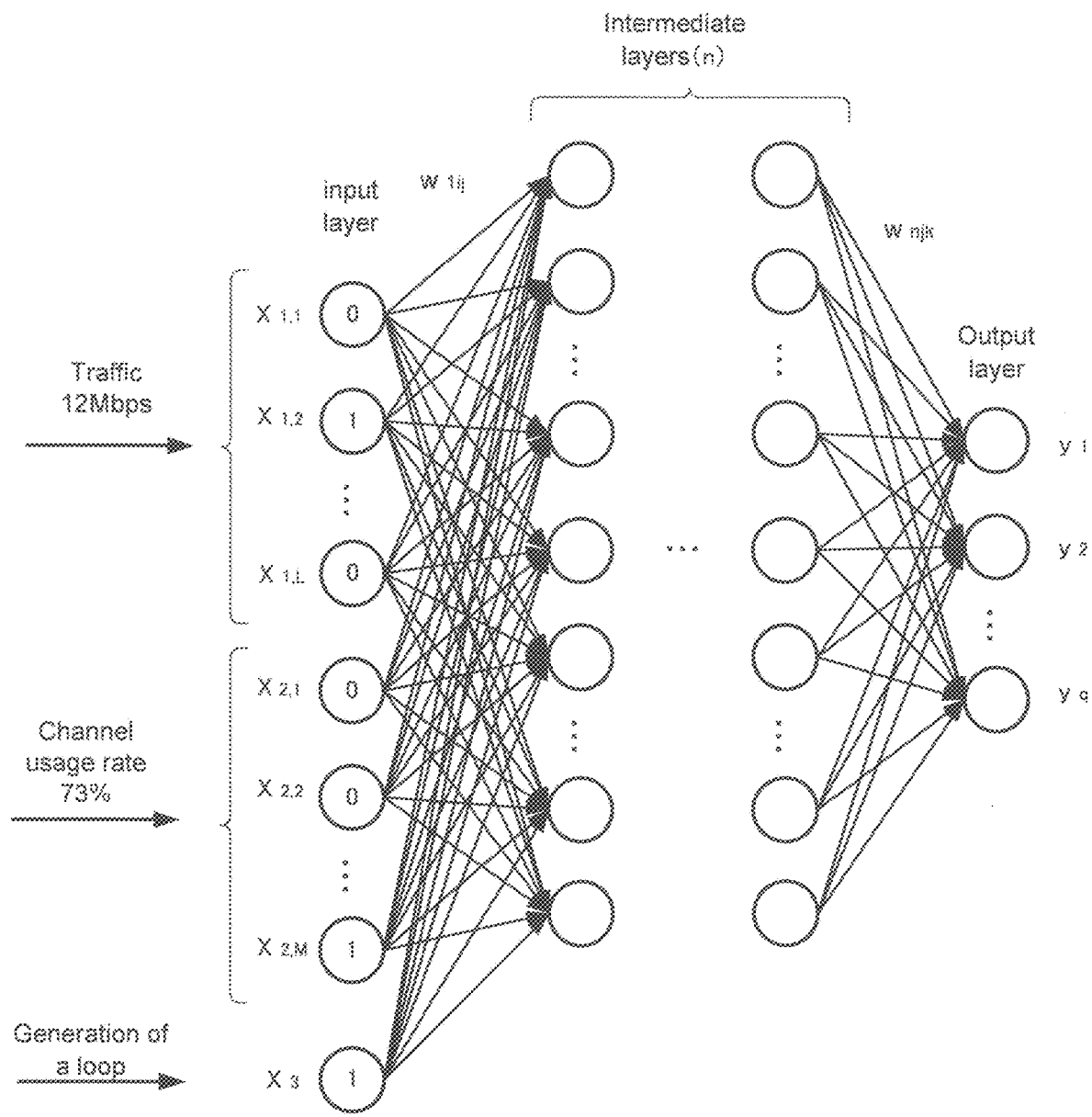
FIG. 4 is a conceptual diagram showing a calculation part of an information processing device related to one embodiment of the present invention.

The calculation part 105 performs a predetermined calculation using information which changes due to communication of the communication relay device 5. In this example, the calculation part 105 performs a calculation of a neural network including an input layer, one or more intermediate layers, and an output layer. Data corresponding to information which changes due to communication of the communication relay device 5 is input from the input part 103 to the input layer. Here, the input part 103 and the calculation part 105 are explained using FIG. 4. FIG. 4 is a conceptual diagram showing a calculation part of the information processing device related to one embodiment of the present invention. In this example, the calculation part 105 classifies the network traffic and the channel usage rate by levels. In addition, the calculation part 105 assigns an element of the input layer to each level, and inputs "1" to an element which corresponds to a detection value and "0" to an element which does not correspond. In other words, the calculation part 105 performs level division for each piece of information which changes due to communication of the communication relay device 5. The element of the input layer which is classified by levels determines whether or not the information which changes due to the communication of the communication relay device 5 corresponds to the information corresponding to the element. In the case when the information corresponds to information corresponding to the element, the value of the input layer is "1". Alternatively, in the case when the information does not correspond to the information corresponding to the element, the value of the input layer is "0".

Specifically, in the case when "0<network traffic≤10 Mbps" is input to the input part 103, the value of the input layers X1, 1 is "1", and if any other value is input it is "0". Similarly, in the case when "10<network traffic≤20 Mbps" is input to the input part 103, the values of the input layers X1, 2 is "1", and if any other value is input, the value of the input layer is "0". In this example, since the network traffic of 12 Mbps is input to the input part 103, the values of the input layers of X1, 2 is "1", and the values of other input layers (X1, 1, X1, 3 to X1, L) is "0". The calculation part 105 also classifies by level information which changes due to communication of the communication relay device 5 other than network traffic according to each information.

Among the information which changes due to the communication of the communication relay device 5, a single input layer element may be used in the case where two types of information are sufficient to express a phenomenon. For example, with respect to the generation of a loop, two types of information such as the present or absence of the generation of a loop are sufficient. Therefore, the number of elements in an input layer which correspond to the generation of a loop may be one. Specifically, when the information "generation of a loop: present" is input to the input part 103, the value of the input layer may be "1". When the information "generation of a loop: absent" is input to the input part 103, the value of the input layer may be "0". With respect to the presence or absence of radio wave interference, the presence or absence of I LAN port link down, and the presence or absence of a buffer overflow, one element of the input layer may be used the same as the generation of a loop.

The weight $w_{1ij}$ between an input layer and an intermediate layer, the weight $w_{njk}$ between an intermediate layer and an output layer, and the number n of intermediate layers are determined in advance by machine learning. Here, machine learning means a known learning method such as a backpropagation method or a genetic algorithm (GA).

Referring again to FIG. 3, the selection part 107 selects at least one candidate device from a plurality of types of candidate devices which are registered as devices which can be replaced from the communication relay device 5 based on a calculation result of the calculation part 105. Here, since a candidate device is a device that can be replaced from the communication relay device 5, it is the same type of device as the communication relay device 5. For example, in the case when the communication relay device 5 is a router, the candidate device is a router different from the communication relay device 5. In this example, the selection part 107 determines predetermined characteristics according to the calculation result. The selection part 107 selects at least one candidate device from a plurality of types of candidate devices by selecting a type of candidate device which corresponds to these characteristics. Here, a predetermined characteristic and a candidate device corresponding to this predetermined characteristic are described using FIG. 5. FIG. 5 is a diagram, for explaining the relationship between the predetermined characteristic of the information processing device and a candidate device related to one embodiment of the present invention.

As described above, the selection part 107 determines a predetermined characteristic as a result of a calculation of the neural network shown in FIG. 4. Specifically, y1 to yq are output in the output layer as a result of a calculation of the neural network. These y1 to yq respectively correspond to the characteristics 203a to 203q shown in FIG. 5 (referred to below as "characteristic 203" in the case where a distinction is not specifically required). In this way, it possible to understand that the predetermined characteristic is determined. In the example shown in FIG. 5, the characteristic 203a is "the number of ports is large", "the data transfer speed is fast", and "there is a VLAN (Virtual LAN) function". At this time, the characteristics includes the characteristics related to the number of ports of the candidate device, the data transfer speed (communication speed) of the candidate device, and the presence or absence of the VLAN function. However, the characteristic is not limited to three. The characteristic may also include at least one of these three characteristics or more than three, and can be appropriately changed.

The candidate device is associated with the characteristic 203. That is, an identification information of the candidate device and price information 207 are associated with the characteristic 203a. Specifically, the identification information 205 of candidate devices "Y-1", "Y-2", and "Y-3", and price information 207 "70,000 yen", "65,000,207 and "48,000 yen" are associated with each these in the characteristic 203a. The identification information 205 of the candidate device is information which can identify the candidate device such as a MAC address or serial number of the candidate device. On the other hand, the price information 207 is information accompanying the candidate device. From the user's point of view, it is not always possible to recognize which product the candidate device is based only on the identification information 205 of the candidate device. Therefore, the price information 207 may also be associated with the characteristic 203 as reference information which shows which product the candidate device is. Although the price information 207 is given as reference information in this example, the present invention is not limited to this. The reference information may also be information which allows a user to recognize the type of product.

Here, since the identification information 205 of at least one candidate device is put on a list corresponding to the characteristic 203, all of the information including the characteristic 203, the identification information 205 of the candidate device, and the price information 207 may be called a "classification list 201". In addition, in the case when there is a plurality of candidate device identification information 205 in one classification list 201, they may be called a "product group 209".

The output part 109 outputs the identification information 205 of the candidate device which is selected by the selection part 107. In addition, the output part 109 may also output the identification information 205 of the candidate device together with other information which is included in the classification list 201 shown in FIG. 5. Similarly, the display part 17 may display other information (price information 207 and the like) which is included in the classification list 201 in addition to the identification information 205 of the candidate device. In addition, a hyperlink may also be set in the identification information 205 of the candidate device. When a user clicks the identification information 205 of the candidate device, the display part 17 may display a purchase site of the candidate device which corresponds to the identification information 205 of the clicked candidate device. Furthermore, the reference information such as price information 207 is information which is useful for a user to select which purchase site to display from among the identification information 205 of the plurality of candidate devices.

The update part 111 acquires a signal for updating the product group 209 which is shown in FIG. 5, and identification information 205 of the candidate device which is added by the update. At this time, the update part 111 updates the product group 209 in the classification list 201. The characteristics of the candidate devices in the classification list 201 are abstractly set. That is, the number of ports has three levels, "many", "usual", and "few". The data transfer speed also has three stages, "fast", "usual", and "slow". As result, the number of ports and the data transfer speed are not set by specific numbers. In other words, the characteristics of the candidate device can be said to be a profile of the category and performance of the candidate device.

The specifications of the candidate devices improve daily. As a result, a candidate device which previously had a large number of ports may have a relatively "normal" or "few" amount of ports due to the appearance of a new candidate device. Therefore, in the case where when a new candidate device appears, the product group 209 may be updated. The update may be performed either manually or automatically. In the case when it is performed automatically, the characteristic 203 and corresponding product group 209, and price information 207 are stored in an external database. Next, when a predetermined condition is satisfied, the update part 111 acquires this information from the database and updates the classification list 201. For example, the predetermined condition is when a predetermined period of time has elapsed (for example, three months after the first update).

On the other hand, since the characteristic of the candidate device itself is relative, it does not need to be updated. That is, even if the candidate device to be registered changes, the characteristic of the candidate device does not need to be updated since it is a characteristic in the registered candidate device. For example, since characteristics such as "there are many ports" and "the data transfer speed is fast" are relative evaluations among the registered candidate devices, only the identification information 205 of the candidate devices which is associated with the characteristic needs to be updated, and there is no need to update the characteristics. Furthermore, the characteristics of the candidate device can also be said to be relative characteristics when compared with a currently used communication relay device 5. In addition, as described above, a predetermined characteristic is determined as a result of performing a calculation of the neural network. That is, the characteristic which is the output layer of the neural network does not need to be updated. As a result, the weight $w_{1ij}$ between the input layer and an intermediate layer, the weight $w_{njk}$ between the intermediate layer and the output layer, and the number n of intermediate layers in the neural network does not need to be updated even when a new communication relay device 5 appears. The software structure of the information processing device was explained above.

Furthermore, in an output function 100, the acquisition part 101, the calculation part 105, the selection part 107, and the output part 109 which are surrounded by a broken line in FIG. 3 are a minimum structure. In the output function 100, the input part 103 and the update part 111 can be added as appropriate.

[Operation Flow]

Next, the operation flow of the information processing device 2 is explained using FIG. 6. FIG. 6 is a diagram showing an operation flow of the information processing device related to one embodiment of the present invention.

The acquisition part 101 acquires information which changes due to communication of the communication relay device 5 from the communication relay device 5 (step S101). Next, the calculation part 105 calculates neural network using information which changes due to communication of the communication relay device 5 (step S103). Next, the selection part 107 determines a predetermined characteristic 203 according to the calculation result, and selects the candidate device of the type which corresponds to the characteristic 203 (step S105). Next, the output part 109 outputs identification information of the candidate device which is selected by the selection part 107. An example of the operation flow of the information processing device 2 was explained above.

According to the present embodiment, the predetermined characteristic 203 is determined by acquiring information which changes due to the communication of the communication relay device 5 from the communication relay device 5 and by performing a calculation of the neural network. This characteristic 203 is associated with the identification information 205 of the candidate device. When the output part 109 outputs the identification information 205 of the candidate device, it is possible to provide a user with the output identification information 205 of the candidate device as an optimum product for solving a problem. As a result, even when a failure is generated in the network due to a performance limit of the communication relay device or a lack of specifications, it is possible to provide information related to an appropriate product (candidate device) which can deal with this failure. A network failure is usually dealt with by changing the settings after confirming a log analysis and the settings of the communication relay device. However, as described above, to deal with a network failure which is caused by a performance limitation or lack of specifications of a communication relay device, it is possible to deal with it by understanding the product lineup of candidate devices which are updated daily and selecting an appropriate product.

In addition, in the present embodiment, the characteristic 203 is determined as the output result of a neural network calculation. In addition, as described above, the characteristic 203 is relative even when a new candidate device appears. As a result, the characteristic 203 does not need to be updated. Therefore, the weight $w_{1ij}$ between the input layer and the intermediate layer, the weight $w_{njk}$ between the intermediate layer and the output layer, and the number n of the intermediate layers in the neural network do not need to be updated even when a new communication relay device 5 appears. Usually, it takes time to calculate the weight $w_{1ij}$ between the input layer and the intermediate layer, the weight $w_{njk}$ between the intermediate layer and the output layer, and the number n of intermediate layers in the neural network by machine learning. Every time a new candidate device appears, the cost of calculating these values again increases. However, in the present embodiment, it is not necessary to update these values. As a result, there is a merit whereby such calculation costs are not normally required.

In addition, in the present embodiment, it is possible to display the classification list 201 which includes the identification information 205 of the candidate device on the display part 17. In addition, a hyperlink may be set in the identification information 205 of the candidate device. In this case, when a user clicks the identification information 205 of the candidate device, a purchase site of the candidate device which corresponds to the identification information 205 of the clicked candidate device is displayed on the display part 17. As a result, it is possible to provide detailed information of a candidate device recommended to a user.

Therefore, according to the present embodiment, it is possible to provide information that can be understood by a general user with no specialized knowledge as to which product should be selected.

Second Embodiment

The information processing device related to the second embodiment is explained. Here, it is called the "information processing device 2A" in order to distinguish it from the information processing device 2 of the first embodiment. The information processing device 2A is substantially the same as the information processing device 2. As a result, a detailed explanation of overlapping points is omitted and only different points are explained in detail.

Figure 7:
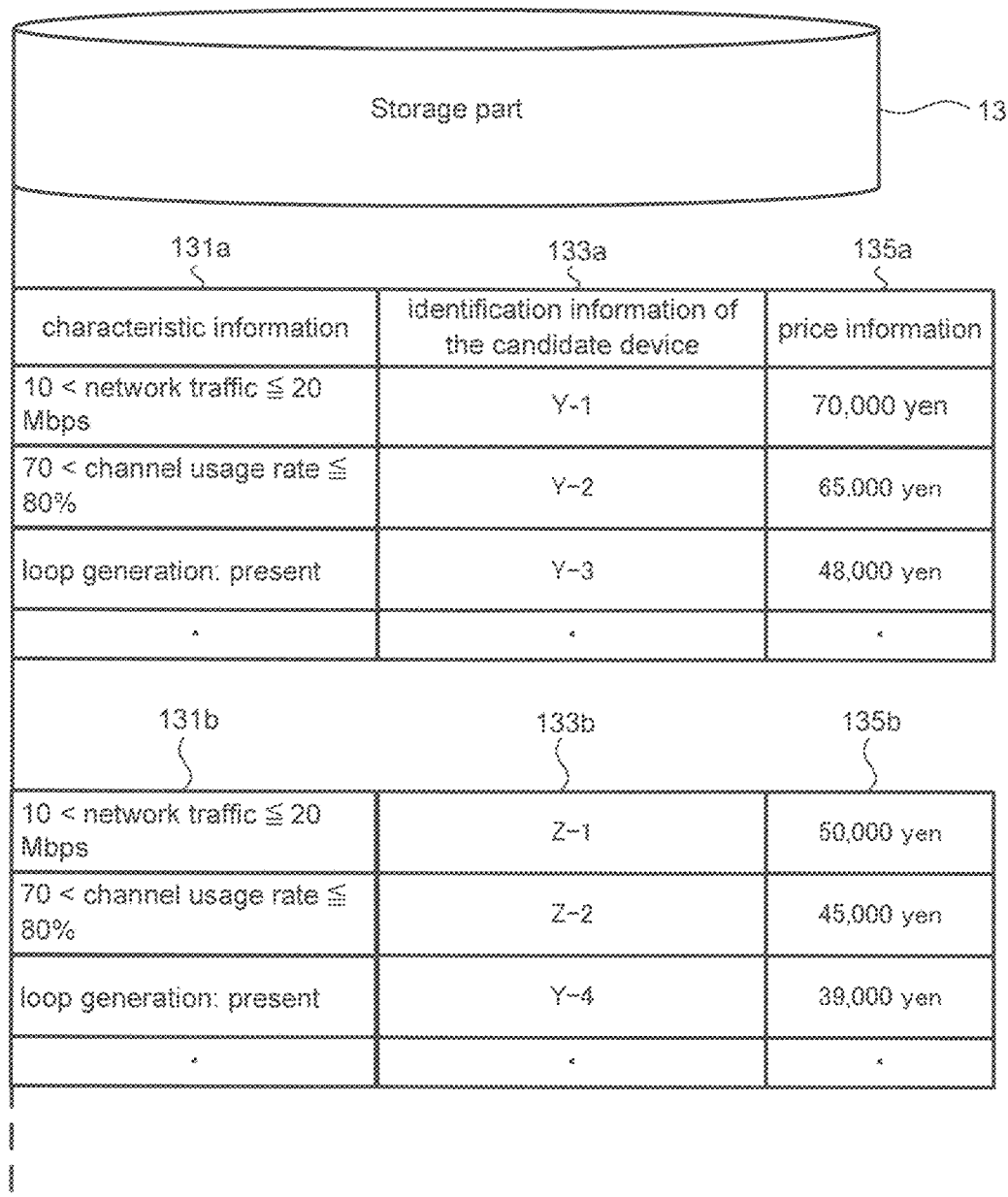
FIG. 7 is a diagram showing a structure of a storage part of an information processing device related to another embodiment of the present invention.

The information processing device 2A has different calculation method from the information processing device 2. The calculation part of the information processing device 2A is called a "calculation part 105A". Here, the difference in calculation methods are explained using FIG. 7. FIG. 7 is a diagram showing a structure of a storage part of an information processing device related to another embodiment of the present invention. Furthermore, in the case where there is no need to distinguish between them, they are denoted as "characteristic information 131", "candidate device identification information 133" and "price information 135".

As is shown in FIG. 7, the characteristic information 131, the identification information 133 of the candidate device, and the price information 135 are stored in the storage part 13 of the information processing device 2A in association with each other. Specifically, the characteristic information 131a includes information such as "10<network traffic≤20 Mbps", "70<channel usage rate≤80%", and "loop generation: present". "Y-1", "Y-2" and "Y-3" are associated with the characteristic information 131a as identification information 133a of the candidate device. "Y-1", "Y-2" and "Y-3" are respectively associated with "70,000 yen", "65,000 yen" and "48,000 yen" as price information 135a.

The acquisition part 101 acquires information which changes due to communication of the communication relay device 5. At this time, the calculation part 105A calculates which of corresponding characteristic information 131 stored in the storage part 13 is applicable. For example, the acquisition part 101 acquires the information such "traffic=12 Mbps", "channel usage rate=73%", and "generation of loop: present" as the information which changes due to communication of the communication relay device 5. At this time, the calculation part 105A determines that the characteristic information 131a corresponds as the result of the calculation. In addition, the output part 109 outputs the identification information 133a of the candidate device associated with the characteristic information 131a.

In the present embodiment, information which changes due to the communication of the communication relay device 5 is acquired from the communication relay device 5 and a calculation is performed. In this way, it is possible to determine the characteristic information 131. The output part 109 outputs the identification information 133 of the candidate device so that dentification information 133 of the output candidate device can be provided to a user as an optimum product.

Furthermore, although the characteristic information 131, identification information 133 of the candidate device and the price information 135 have been explained on the assumption that they are stored in the storage part 13 of the information processing device 2A, the present invention is not limited to this. This information may also be stored in a storage device outside the information processing device 2A. In this case, the information processing device 2A refers an external storage device when the calculation part 105A performs a calculation.

Furthermore, in the explanation above, although a network was explained using a communication relay device such as a router, switch or wireless LAN access point as an example, the present invention is not limited to this. If the target network device may have performance limitations or lack of specifications and a network failure is generated due to these, an audio network communication relay device such as "Dante (registered trademark)" is the target of the present invention. In addition, the present invention is not limited to the embodiments described above and can be changed as appropriate without departing from the spirit of the present invention.

What is claimed is:

1. A machine learning device comprising:
a processor; and
a memory device configured to store a program, the program executed by the processor to cause the processor to:
obtain first information from a communication relay device, the first information, which includes at least one of second information indicating a communication status of the communication relay device and third information related to internal resources of the communication relay device, changing due to communication of the communication relay device; and
perform machine learning by using a correlating relationship between the first information and a characteristic of a candidate device that can replace the communication relay device;

wherein fourth information defining a calculation is generated by performing the machine learning;

wherein the fourth information is a first weight between an input layer and an intermediate layer, and a second weight between the intermediate layer and an output layer among a calculation of a neural network including the input layer, the output layer and the intermediate layer; and wherein the first and second weights and a number of intermediate layers in the neural network are not updated even when the candidate device replaces the communication relay device, such that only identification information of the candidate device related to features based on a result of the calculation of the neural network is updated.

2. The machine learning device according to claim 1, wherein the characteristic is related to at least one of a port number of the candidate device, a communication speed of the candidate device and the presence or absence of a VLAN.

3. The machine learning device according to claim 1, wherein the characteristic is a relatively expressed characteristic among a plurality of registered candidate devices.

4. The machine learning device according to claim 1, wherein the second information includes at least one information among information related to network traffic, information related to a channel usage rate, information related to a CRC error rate and information related to the presence or absence of radiowave interference, and information related to the presence or absence of link-down and information related to the presence or absence of the occurrence of a loop.

5. The machine learning device according to claim 1, wherein the second information includes information related to network traffic, information related to a channel usage rate, information related to a CRC error rate and information related to the presence or absence of radiowave interference, and information related to the presence or absence of link-down and information related to the presence or absence of the occurrence of a loop.

6. An information processing device comprising:
a processor; and
a memory device configured to store a program, the program executed by the processor to cause the processor to:
obtain first information from a communication relay device, the first information, which includes at least one of second information indicating a communication state of the communication relay device and third information related to internal resources of the communication relay device, changing due to communication of the communication relay device;
perform a calculation using the first information; and
select at least one candidate device based on the result of the calculation from a plurality of registered candidate devices that can replace the communication relay device based on the result of the calculation;
wherein fourth information defining the calculation is a first weight between an input layer and an intermediate layer, and a second weight between the intermediate layer and an output layer among a calculation of a neural network including the input layer, the output layer and the intermediate layer; and
wherein the first and second weights and a number of intermediate layers in the neural network are not updated even when the at least one candidate device replaces the communication relay device, such that only an identification information of the at least one candidate device related to features based on a result of the calculation of the neural network is updated.

7. The information processing device according to claim 6, wherein the program causes the processor to output information for identifying the at least one candidate device.

8. The information processing device according to claim 6, wherein the program causes the processor to input data in response to the first information to the input layer, the calculation result being output to the output layer.

9. The information processing device according to claim 8, wherein each of the registered candidate devices is correlated with characteristics of the at least one candidate device,
at least one characteristic is determined based on the result of the calculation, and
the at least one candidate device corresponding to the at least one characteristic is selected.

10. The information processing device according to claim 9, wherein the characteristic is related to at least one of a port number of the at least one candidate device, a communication speed of the at least one candidate device and the presence or absence of a VLAN.

11. The information processing device according to claim 9, wherein the characteristic is a relatively expressed characteristic among the plurality of registered candidate devices.

12. The information processing device according to claim 9, wherein the program causes the processor to:
obtain a first signal for updating a type of candidate device among the plurality of registered candidate devices, and information for identifying a second candidate device to be added by the update,
update the type of candidate device to the second candidate device, and
modify characteristics correlated with the registered candidate device by the update.

13. The information processing device according to claim 6, wherein the second information includes information related to network traffic, a channel usage rate, a CRC error rate and the presence or absence of radiowave interference, and information related to the presence or absence of link-down and information related to the presence or absence of the occurrence of a loop.

14. An output device comprising:
a processor; and
a memory device configured to store a program, the program executed by the processor to cause the processor to:
obtain first information from a communication relay device, the first information, which includes at least one of second information indicating a communication state of the communication relay device and third information related to internal resources of the communication relay device, changing due to communication of the communication relay device, and obtain a learning result performed by machine learning based on the first information and a characteristic of a candidate device that can replace the communication relay device; and
output the characteristic of the candidate device based on the learning result with respect to the first information;
wherein information defining a calculation is generated in advance by performing the machine learning;
wherein the information defining the calculation is a first weight between an input layer and an intermediate layer, and a second weight between the intermediate layer and an output layer among a calculation of a neural network including the input layer, the output layer and the intermediate layer; and wherein the first and second weights and a number of intermediate layers in the neural network are not updated even when the candidate device replaces the communication relay device, such that only an identification information of the candidate device related to features based on a result of the calculation of the neural network is updated.

* * * * *